US012087261B2

(12) United States Patent
Maeta

(10) Patent No.: US 12,087,261 B2
(45) Date of Patent: Sep. 10, 2024

(54) NOISE SUPPRESSOR

(71) Applicant: MITSUBISHI HEAVY INDUSTRIES, LTD., Tokyo (JP)

(72) Inventor: Koji Maeta, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 24 days.

(21) Appl. No.: 17/988,195

(22) Filed: Nov. 16, 2022

(65) Prior Publication Data

US 2023/0162716 A1 May 25, 2023

(30) Foreign Application Priority Data

Nov. 19, 2021 (JP) ................................ 2021-188606

(51) Int. Cl.
*G10K 11/16* (2006.01)

(52) U.S. Cl.
CPC .................................. *G10K 11/161* (2013.01)

(58) Field of Classification Search
CPC .. F02B 77/13; F04B 39/0033; F04B 39/0038; G10K 11/161
See application file for complete search history.

(56) References Cited

U.S. PATENT DOCUMENTS 4,128,769 A * 12/1978 Bons ......................... F02C 7/24 181/282
10,309,302 B2 * 6/2019 Wilhelm ................ F02B 77/13
2019/0301322 A1 * 10/2019 Strombeck ............ F02B 63/044
2022/0205385 A1 * 6/2022 Wang ................. F02M 35/1211
2023/0267905 A1 * 8/2023 Gontier ................ G10K 11/172 181/284

FOREIGN PATENT DOCUMENTS

JP 53028209 A * 3/1978
JP 4-125620 U 11/1992
JP 2000213369 A * 8/2000 ............. F02B 63/04
JP 2005188453 A * 7/2005

OTHER PUBLICATIONS

English translation of JP 2000213369 A; accessed Feb. 6, 2024 via Espacenet.com; <https://worldwide.espacenet.com/patent/search/family/011811168/publication/JP2000213369A?q=pn%3DJP2000213369A> (Year: 2000).*
English translation of JP 2013186257 A; accessed Feb. 6, 2024 via Espacenet.com; <https://worldwide.espacenet.com/patent/search/family/049387744/publication/JP2013186257A?q=pn%3DJP2013186257A> (Year: 2013).*

* cited by examiner

*Primary Examiner* — Jeremy A Luks
(74) *Attorney, Agent, or Firm* — Birch, Stewart, Kolasch & Birch, LLP

(57) ABSTRACT

A noise suppressor is removably installed in power generator equipment including an enclosure and a power generator unit. The enclosure includes at least one of an air intake port and an air discharge port that are vents. The power generator unit is covered with the enclosure. The noise suppressor includes a tubular member having a first opening that opens to a direction different from the vent and a second opening that opens to the vent, forming a channel for gas leading from the first opening to the second opening, and provided with an acoustic liner inside the channel. The tubular member has such a shape that the channel bends at a plurality of points.

9 Claims, 8 Drawing Sheets

NOISE SUPPRESSOR

CROSS-REFERENCE TO RELATED APPLICATIONS

The present application claims priority to and incorporates by reference the entire contents of Japanese Patent Application No. 2021-188606 filed in Japan on Nov. 19, 2021.

FIELD

The present disclosure relates to a noise suppressor.

BACKGROUND

In an apparatus that generates noise, such as a power generator engine, there has been a known configuration for reducing the noise by installing a sound absorber, such as a vent, to a part where sound is emitted (see Patent Literature 1, for example).

CITATION LIST

Patent Literature

Patent Literature 1: Utility Model Application Laid-open No. H4-125620

SUMMARY

Technical Problem

An apparatus that generates noise, such as a power generator engine mentioned above, requires a configuration for suppressing the generated noise appropriately.

The present disclosure has been made in view of the foregoing, and an object thereof is to provide a noise suppressor capable of suppressing the noise appropriately in power generator equipment provided with a power generator unit that is covered with an enclosure.

Solution to Problem

A noise suppressor according to the present disclosure is removably installed in power generator equipment including an enclosure and a power generator unit. The enclosure includes at least one of an air intake port and an air discharge port that are vents. The power generator unit is covered with the enclosure. The noise suppressor includes a tubular member having a first opening that opens to a direction different from the vent and a second opening that opens to the vent, forming a channel for gas leading from the first opening to the second opening, and provided with an acoustic liner inside the channel. The tubular member has such a shape that the channel bends at a plurality of points.

Advantageous Effects of Invention

According to the present disclosure, it is possible to appropriately suppress the noise in power generator equipment that includes a power generator unit that is covered with an enclosure.

DESCRIPTION OF EMBODIMENTS

An embodiment of a noise suppressor according to the present disclosure will now be explained with reference to the drawings. However, this embodiment is not intended to limit the scope of the present disclosure in any way. In addition, the following embodiment includes elements that are replaceable or that are easy to replace for those skilled in the art, or those that are substantially the same.

Figure 1:
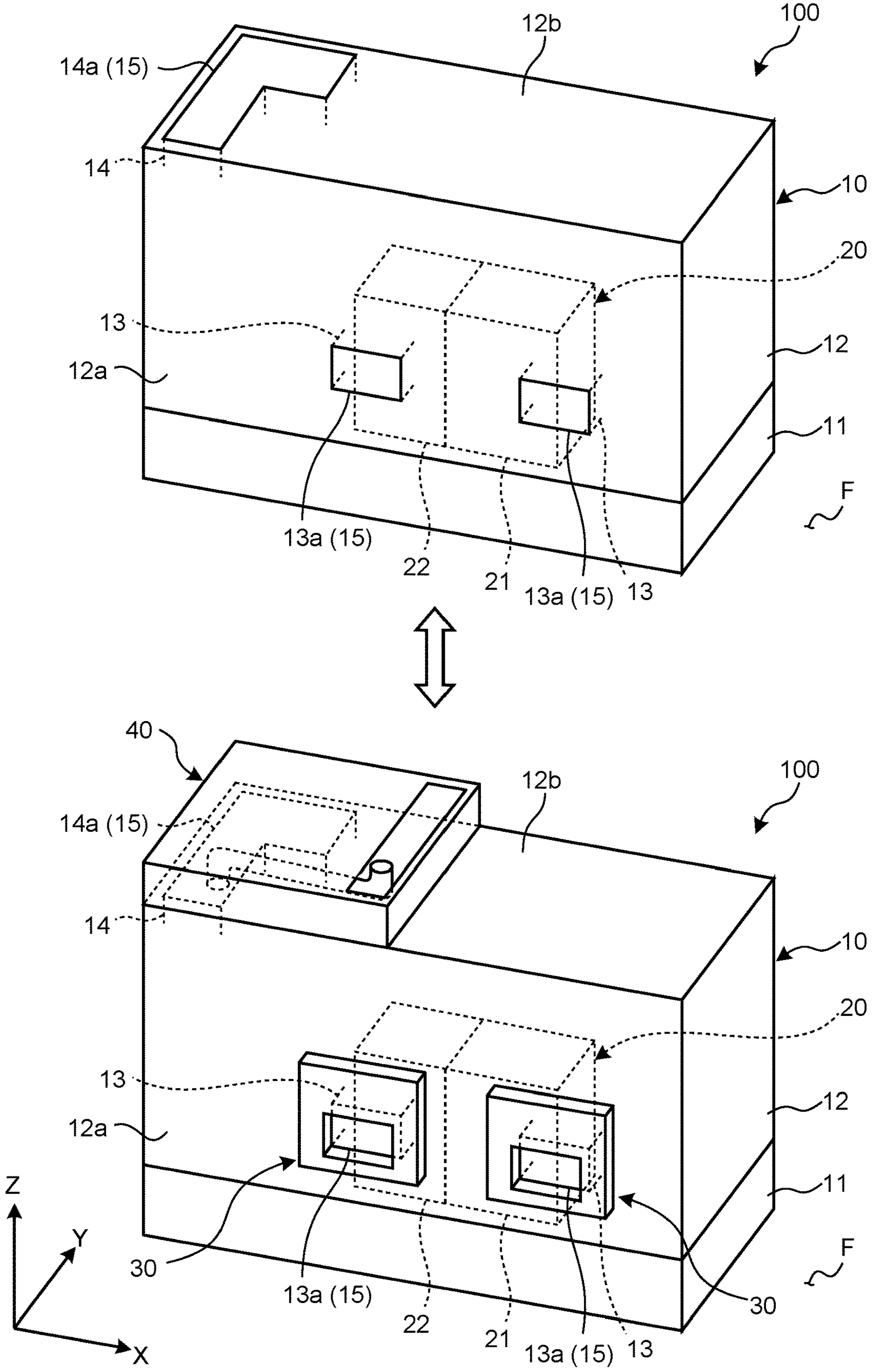
FIG. 1 is a schematic perspective view of an example of power generator equipment to which noise suppressors are applied.

FIG. 1 is a perspective view of an example of power generator equipment 100 using noise suppressors 30 and 40. In the following explanation, the longitudinal direction of the power generator equipment 100 (left-to-right direction in FIG. 1) will be explained as an X direction, the short-hand direction of the power generator equipment 100 (depth direction in FIG. 1) will be explained as a Y direction, and the height direction of the power generator equipment 100 (vertical direction in FIG. 1) will be explained as a Z direction. In each of these coordinates, the direction to which the arrow points will be explained as a +direction, and the direction opposite to that to which the arrow points will be explained as a −direction.

As illustrated in FIG. 1, the power generator equipment 100 includes an enclosure 10 and a power generator unit 20. The power generator unit 20 is disposed inside of the enclosure 10, and is covered with the enclosure 10.

The enclosure 10 includes a base plate 11, a casing 12, an air intake duct 13, and an air discharge duct 14. The base plate 11 has a rectangular plate-like shape in a plan view, and is installed on a floor surface F. The casing 12 has a rectangular box-like shape, for example.

The air intake duct 13 draws the air from the outside of the enclosure 10 into the inside of the enclosure 10. The air intake duct 13 has air intake ports 13*a* facing outside. The air intake ports 13*a* are disposed on a −Y-side face 12*a* of the casing 12, for example.

The air inside of the enclosure 10 is discharged through the air discharge duct 14 to the outside of the enclosure 10. The air discharge duct 14 has an air discharge port 14*a* facing the outside. The air discharge port 14*a* is disposed on a face 12*b* corresponding to the ceiling (the +Z-side face) of the casing 12, for example.

The power generator unit 20 is provided with a power generator 21 and a power-generating source 22. The power generator 21 and the power-generating source 22 are disposed on the base plate 11, for example. The power-generating source 22 has an engine, such as a diesel engine. The power generator 21 is coupled in a manner driven by the engine included in the power-generating source 22. The rotational driving power of the engine is transmitted to the power generator 21 and drives the power generator 21, and electric power is generated thereby.

The air comes into the enclosure 10 through the air intake ports 13*a* of the air intake duct 13, passes through the power generator unit 20, and is discharged from the air discharge port 14*a* on the air discharge duct 14. In the enclosure 10, an air channel is formed between the air intake ports 13*a* and the air discharge port 14*a*. The air intake ports 13*a* and the air discharge port 14*a* serve as vents 15.

Figure 2:
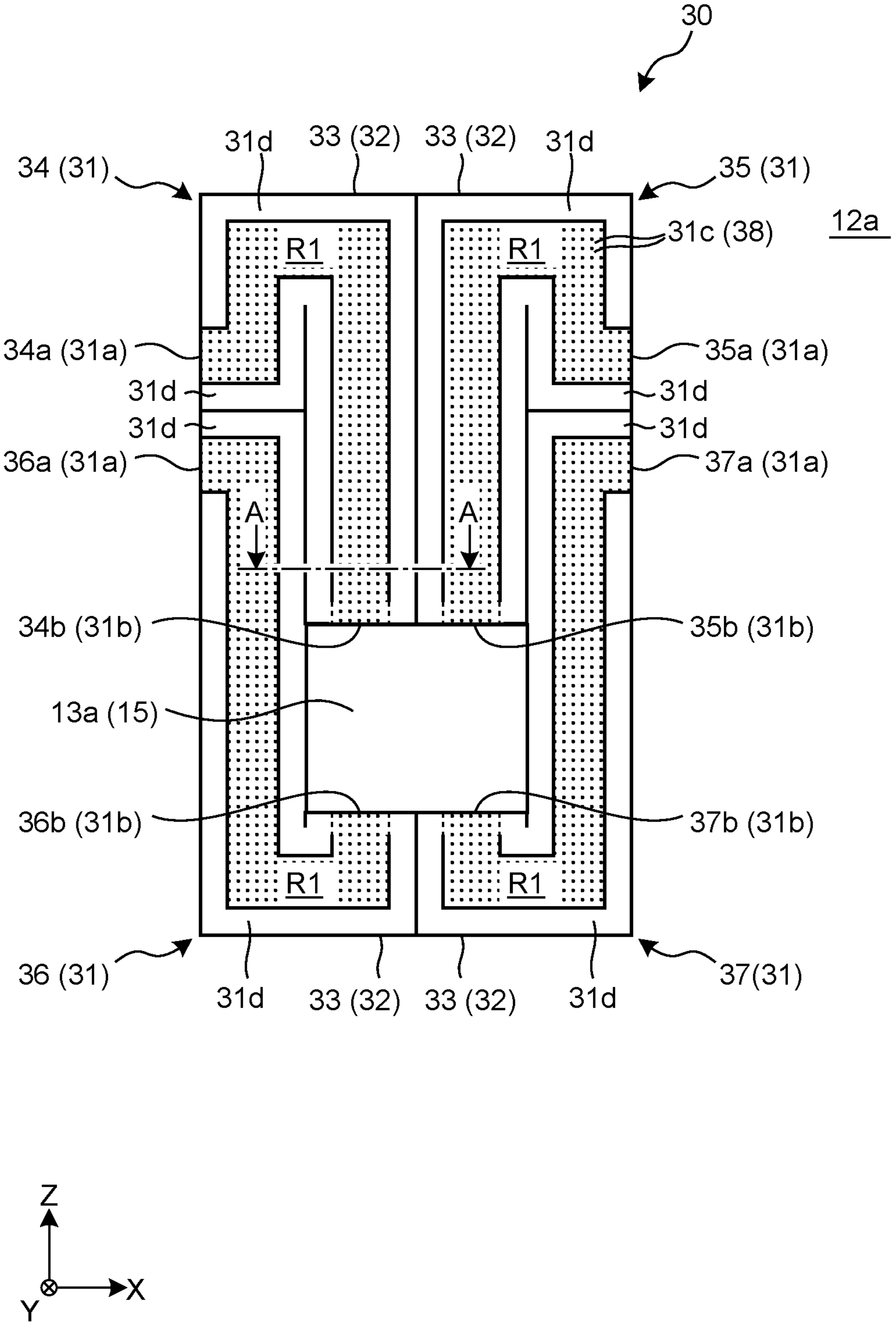
FIG. 2 is a schematic illustrating an example of the noise suppressors, viewing a casing from a −Y side.
Figure 3:
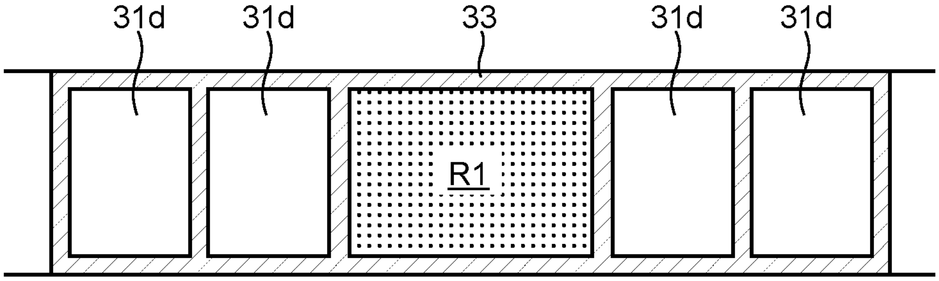
FIG. 3 is a schematic illustrating a configuration on the cross section A-A in FIG. 2.

Noise suppressors 30 are disposed in a manner surrounding the respective air intake ports 13*a*. The noise suppressors 30 suppress the noise emitted from the air intake ports 13*a*. FIG. 2 is a diagram schematically illustrating an example of the noise suppressors 30, viewing the casing 12 from the −Y side. FIG. 2 illustrates the −Y-side surface as transparent so that the internal structure is visible. FIG. 3 is schematic illustrating the configuration on a cross section A-A in FIG. 2. As illustrated in FIGS. 2 and 3, each of the noise suppressors 30 includes tubular members 31 and acoustic dampers 32.

Each of the tubular members 31 has a first opening 31*a* and a second opening 31*b*. The first opening 31*a* opens to a direction different from the air intake port 13*a*. The second opening 31*b* opens to the air intake port 13*a*. The tubular member 31 has walls 33. The walls 33 of the tubular member 31 form a channel R1 for gas, the channel leading from the first opening 31*a* to the second opening 31*b*. The tubular member 31 has such a shape that the channel R1 bends at a plurality of points.

The tubular members 31 are disposed at positions surrounding the air intake port 13*a*, when viewed in a direction perpendicular to the −Y-side face 12*a* (surface) of the casing 12 included in the enclosure 10. In this embodiment, the noise suppressor 30 is arranged in a rectangular annular shape, in a manner surrounding the four sides of the rectangular air intake port 13*a*.

The tubular member 31 is provided in plurality, for example. In this embodiment, the noise suppressor 30 includes a tubular member 31 disposed on the upper left side of the air intake port 13*a* in FIG. 3 (hereinafter, referred to as a tubular member 34), a tubular member 31 disposed on the upper right side of the air intake port 13*a* in FIG. 3 (hereinafter referred to as a tubular member 35), a tubular member 31 disposed on the lower left side of the air intake port 13*a* in FIG. 3 (hereinafter referred to as a tubular member 36), and a tubular member 31 disposed on the lower right side of the air intake port 13*a* in FIG. 3 (hereinafter, referred to as a tubular member 37).

The tubular member 34 has a second opening 34*b* opening to the −Z direction and to the air intake port 13*a*. The tubular member 34 linearly extends along the face 12*a*, from the second opening 34*b* to the +Z direction, bends toward a −X direction, and folds back to a −Z direction. The tubular member 34 has a first opening 34*a* that opens to the −X direction on one tip end portion of the folded-back portion. The tubular member 34 has a configuration in which the part extending from the second opening 31*b* to the +Z direction (the part including the +Z-side end) and the folded-back portion are positioned adjacently to each other with the walls 33 interposed therebetween.

The tubular member 35 has a second opening 35*b* that opens to the air intake port 13*a* in the −Z direction. The tubular member 35 linearly extends along the face 12*a*, from the second opening 35*b* to the +Z direction, bends toward the +X direction, and folds back to the −Z direction. The tubular member 35 has a first opening 35*a* that opens to the +X direction on one tip end portion of the folded-back portion (the −Z side end). The tubular member 35 has a configuration in which the part extending from the second opening 35*b* to the +Z direction (the part including the +Z-side end) and the folded-back portion are positioned adjacently to each other with the walls 33 interposed therebetween. The tubular member 34 and the tubular member 35 have configurations in which their respective parts extending in the +Z direction from the second opening 34*b* and the second opening 35*b* are positioned adjacently to each other with the walls 33 interposed therebetween.

The tubular member 36 has a second opening 36*b* that opens to the +Z direction and to the air intake port 13*a*. The tubular member 36 linearly extends along the face 12*a*, from the second opening 36*b* to the −Z direction, bends toward the −X direction, and folds back to the +Z direction. The tubular member 36 has a first opening 36*a* that opens to the −X direction on a part (the +Z-side tip end portion) of the folded-back portion. The tubular member 36 has a configuration in which the part extending from the second opening 36*b* to the +Z direction (the part including the +Z-side end) and the folded-back portion are positioned adjacently to each other with the walls 33 interposed therebetween. The tubular member 36 also has a configuration in which a part of the folded-back portion (the part including the +Z-side tip end portion) and a part of the tubular member 34 (a part of the folded-back portion on the side of the second opening 34*b*) are positioned adjacently to each other with the walls 33 interposed therebetween.

The tubular member 37 has a second opening 37*b* that opens to the +Z direction and to the air intake port 13*a*. The tubular member 37 linearly extends along the face 12*a*, from the second opening 37*b* to the −Z direction, bends toward the +X direction, and folds back to the +Z direction. The tubular member 37 has a first opening 37*a* that opens to the +X direction on one tip end portion of the folded-back portion. The tubular member 37 has a configuration in which the part extending from the second opening 37*b* to the −Z direction (the part including the +Z-side end) and the folded-back portion are positioned adjacently to each other with the wall 33 interposed therebetween. The tubular member 36 and the tubular member 37 have configurations in which their respective parts extending in the −Z direction from the second opening 36*b* and the second opening 37*b* are positioned adjacently to each other with the walls 33 interposed therebetween.

All of the tubular members 31 extend from the second opening 31*b* in directions along the face 12*a*. In other words, each of the tubular members 31 extends from the second opening 31*b* to the X direction, to the Z direction, or to a direction of the resultant force of the X direction and the Z direction. This configuration keeps the size of the tubular member 31 in the Y-direction small.

The tubular members 31 may be arranged at symmetrical positions with respect to the air intake port 13*a*, for example, viewing from a direction perpendicular to the face 12*a*. In such a case, for example, the tubular members 31 may be arranged at positions symmetrical to one another in the X direction, or positions symmetrical to one another in the X direction and the Y direction, with respect to the air intake port 13*a*.

Each of the tubular members 31 has an acoustic liner 38 formed by a plurality of pass-through holes 31*c* provided along the channel R1. Each of the pass-through holes 31*c* has a circular shape, for example, and the pass-through holes 31*c* are provided across the entire tubular member 31.

The acoustic dampers 32 are disposed along the tubular members 31. In this embodiment, the acoustic dampers 32 are provided on the walls 33 of the tubular members 31, respectively. Specifically, hollow sections 31*d* are provided inside the walls 33. The hollow sections 31*d* have closed ends on the side of the first opening 31*a* of the corresponding tubular member 31, and their ends on the side of the second opening 31*b* of the tubular members 31 are connected to the channel R1. With this configuration, the walls 33 serve as the acoustic dampers 32. In this embodiment, the hollow sections 31*d* are formed in such a manner that the cross-sectional area is constant or nearly constant, across the range from the side of the second opening 31*b* to the side of the first opening 31*a* of the tubular member 31. Alternatively, the acoustic dampers 32 may also be provided separately from the walls 33. In such a case, the acoustic damper 32 may be disposed along the walls 33, on both sides of the direction in which the channel R1 extends, either on the outside or the inside of the tubular member 31.

Figure 4:
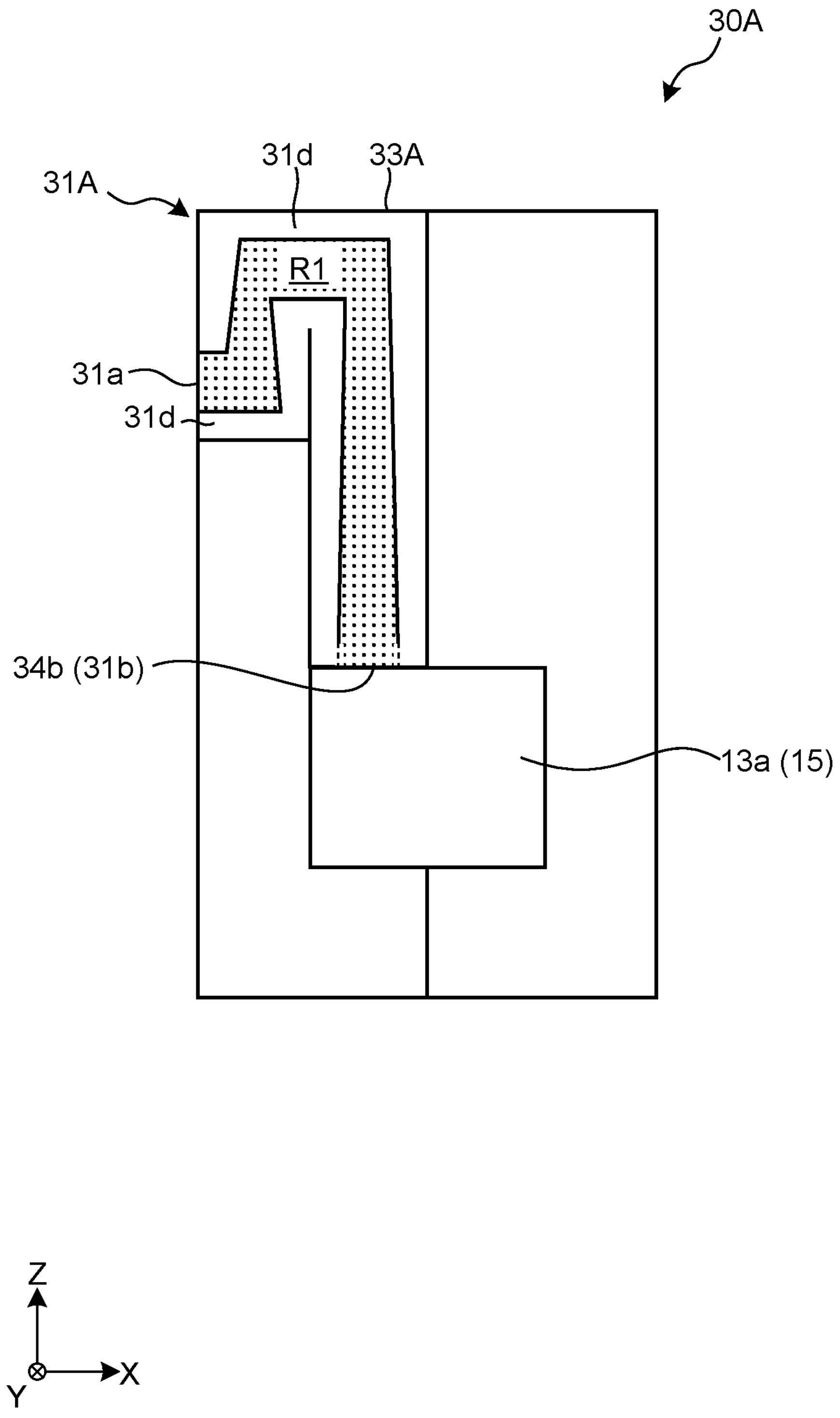
FIG. 4 is a schematic illustrating a configuration of the noise suppressor according to one modification.

FIG. 4 is a schematic illustrating a configuration of a noise suppressor 30A according to one modification. In FIG. 4, only the configuration of a tubular member 31A on the upper left side is illustrated, but the same explanation is also applicable to the other tubular members. The noise suppressor 30A illustrated in FIG. 4 has such a shape that the cross-sectional area of the hollow section 31*d* inside a wall 33A changes in the direction along the channel R1. In this configuration, it is possible to increase the band of absorbable frequencies of the noise emitted from the air intake port 13*a*, compared with that in the noise suppressor 30 described above.

Figure 5:
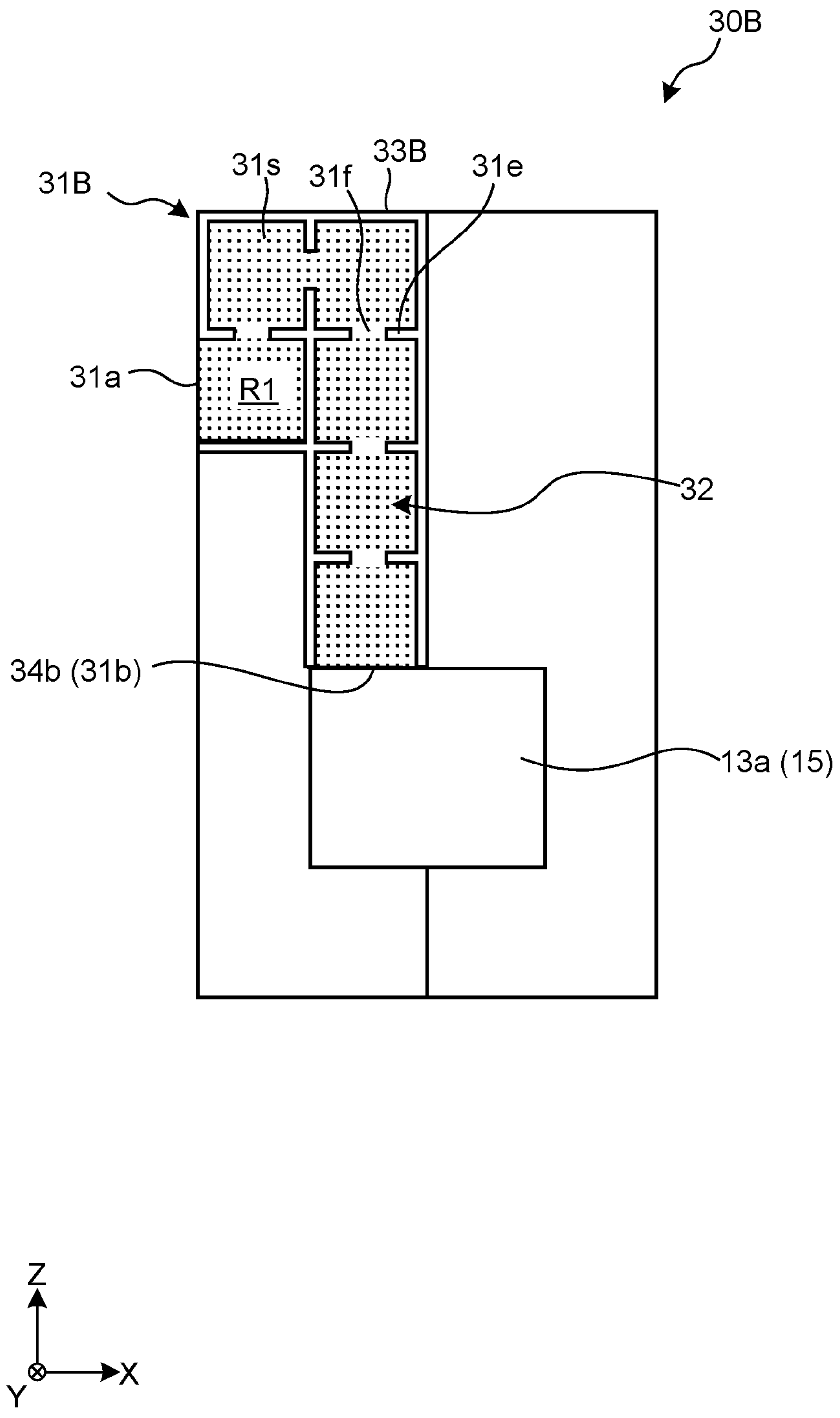
FIG. 5 is a schematic illustrating a configuration of a noise suppressor according to another modification.

FIG. 5 is a schematic illustrating a configuration of a noise suppressor 30B according to another modification. In FIG. 5, only the configuration of a tubular member 31B on the upper left side is illustrated, but the same explanation is applicable to the other tubular members. In the noise suppressor 30B illustrated in FIG. 5, each wall 33B of the tubular member 31B has a plate-like shape and a solid structure without the hollow section 31*d*. The tubular member 31B has partitions 31*e* that partition the channel R1 at a plurality of respective points in the direction along the channel R1. The partitions 31*e* partition the channel R1 inside of the tubular member 31B into a plurality of spaces 31*s*. Each of the partitions 31*e* is provided with a connecting hole 31*f*. The connecting holes 31*f* connect the spaces 31*s* adjacent to each other. By partitioning the channel R1 into a plurality of spaces 31*s* with the partitions 31*e*, and connecting the spaces 31*s* with the connecting holes 31*f* provided to the partitions 31*e*, an acoustic damper 32 can be provided inside the channel R1.

Figure 6:
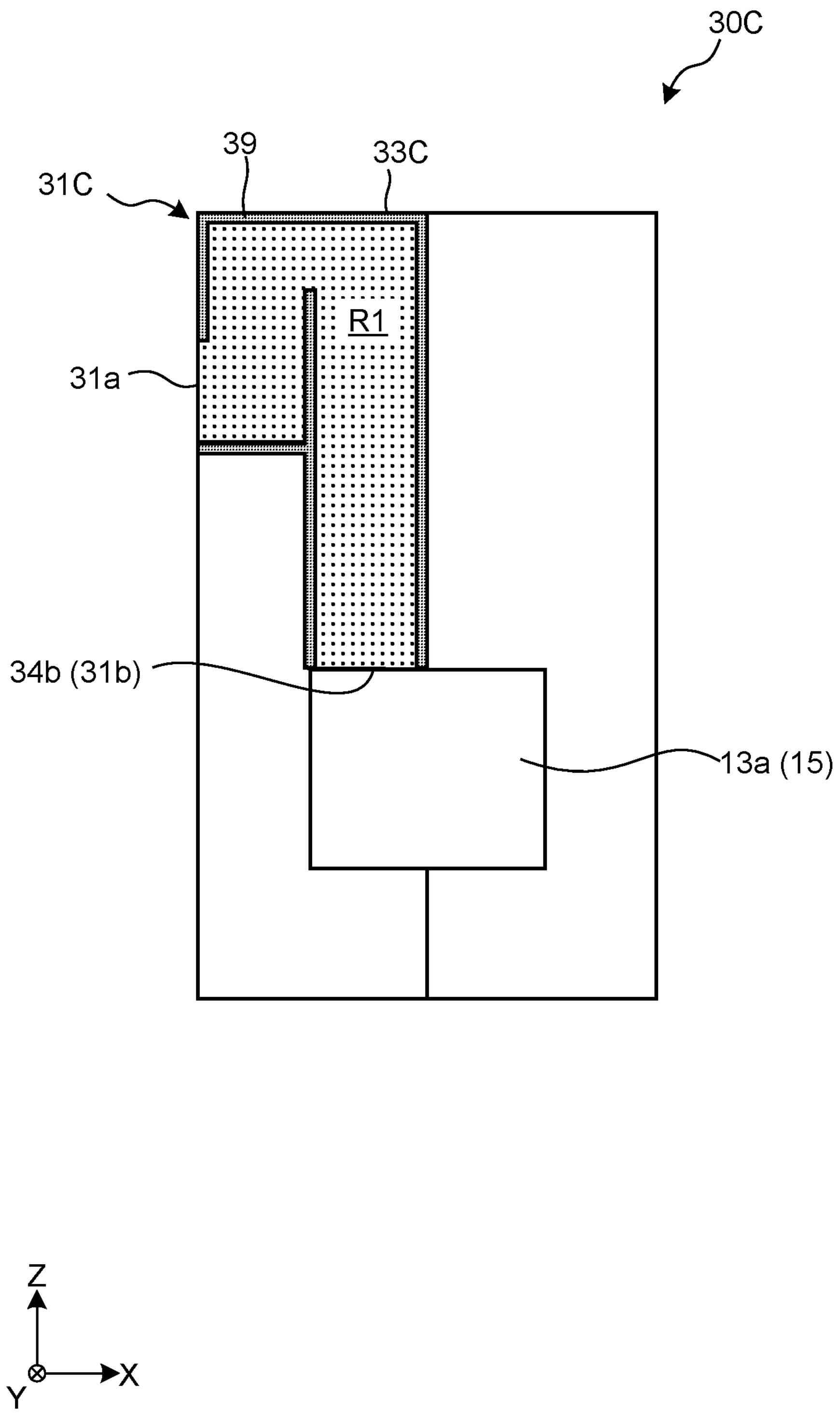
FIG. 6 is a schematic illustrating a configuration of a noise suppressor according to another modification.

FIG. 6 illustrates the configuration of the noise suppressor 30C according to another modification. In FIG. 6, only the configuration of a tubular member 31C on the upper left side is illustrated, but the same explanation is applicable to the other tubular members. In the noise suppressor 30C illustrated in FIG. 6, the wall 33C of the tubular member 31C has a plate-like shape and a solid structure without the hollow sections 31*d*. The tubular member 31C has a structure with a perforated plate 39 placed on the inner surface of the wall 33C. With this configuration, noise can be reduced efficiently.

The noise suppressors 30, 30A, 30B described above may be configured to be removable from the casing 12 of the enclosure 10 using an attachment, not illustrated, such as a magnet.

Figure 7:
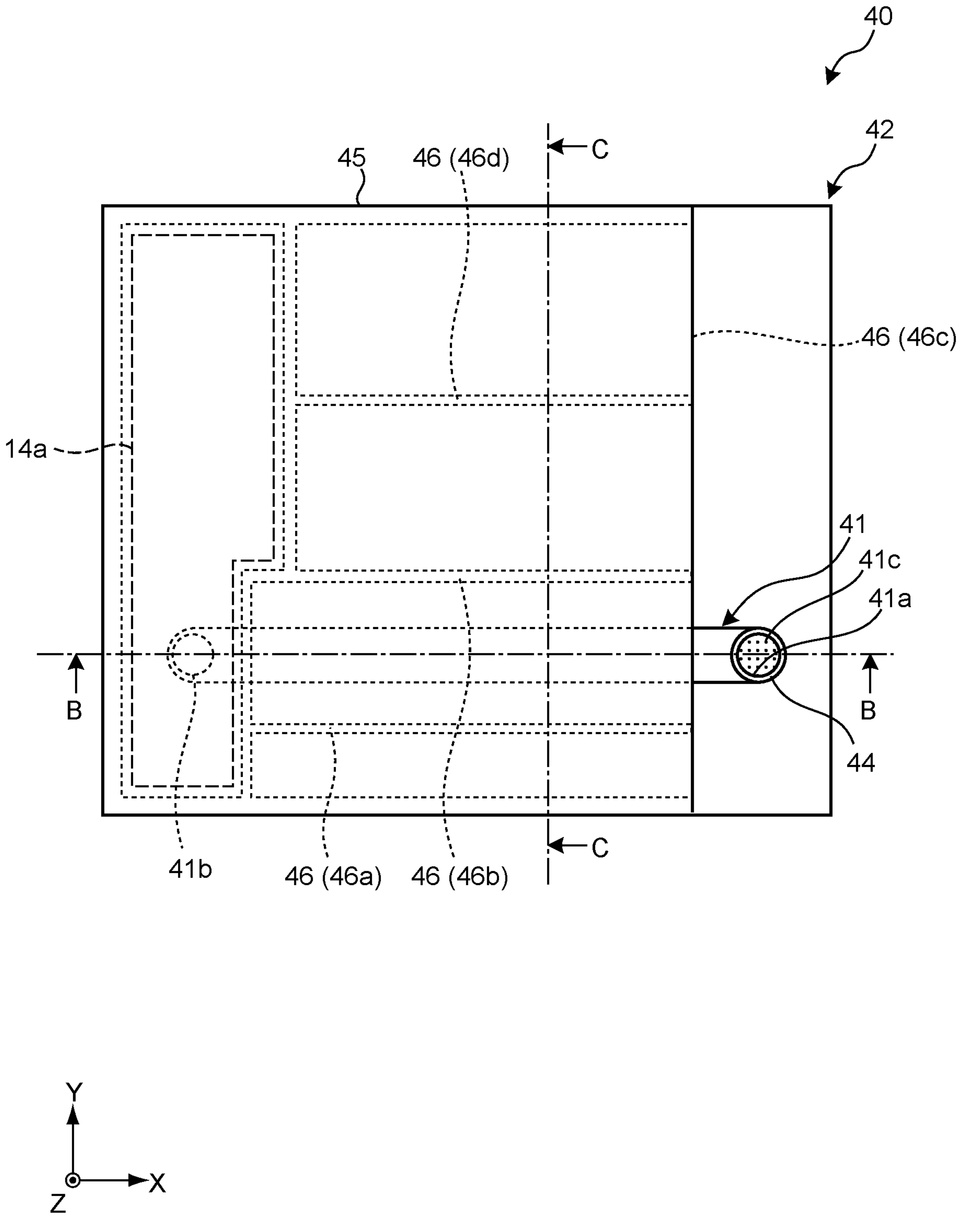
FIG. 7 is a schematic illustrating an example of the noise suppressor, viewing the casing from a +Z side.
Figure 8:
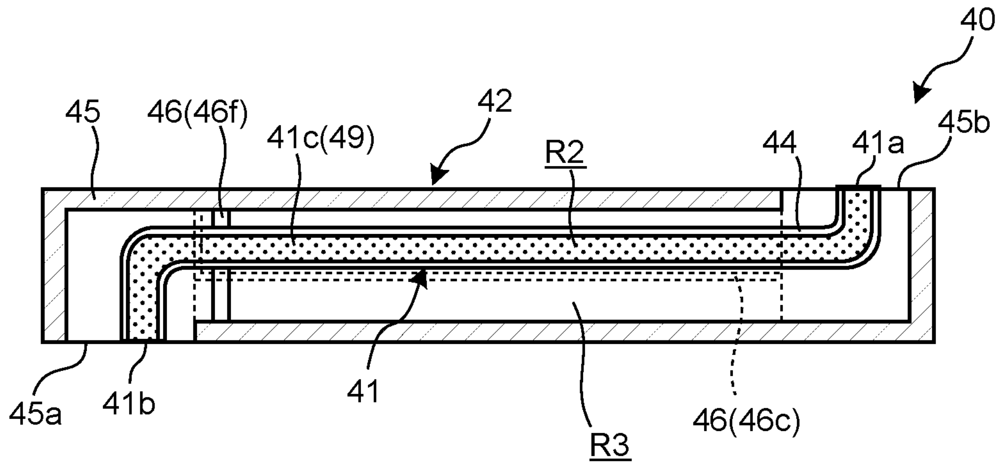
FIG. 8 is a schematic illustrating a configuration on the cross section B-B in FIG. 7.
Figure 9:
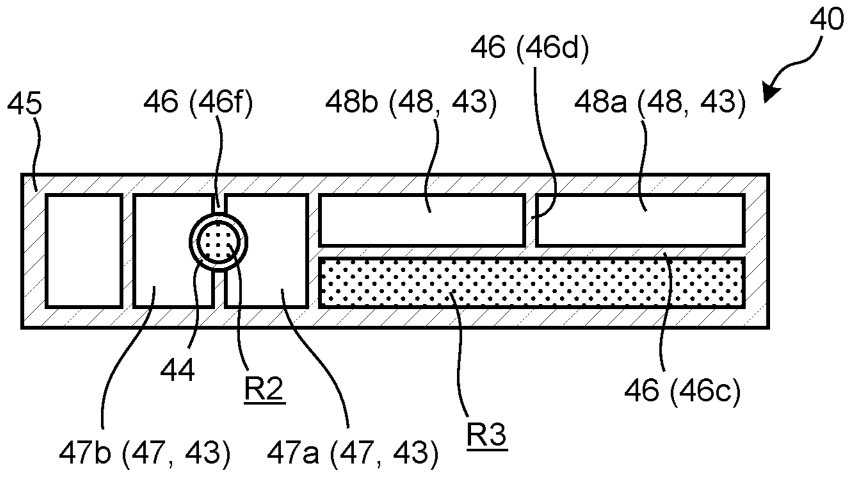
FIG. 9 is a schematic illustrating a configuration on the cross section C-C in FIG. 7.

Returning to FIG. 1, the noise suppressor 40 is disposed in the air discharge port 14*a*. The noise suppressor 40 suppresses the noise emitted from the air discharge port 14*a*. FIG. 7 is a schematic illustrating an example of the noise suppressor 40, viewing the casing 12 from the +Z side. FIG. 8 is a schematic illustrating the configuration on the cross section B-B in FIG. 7. FIG. 9 is a schematic illustrating the configuration on the cross section C-C in FIG. 7. As illustrated in FIGS. 7 to 9, the noise suppressor 40 has a tubular member 41, a cover member 42, and an acoustic damper 43.

The tubular member 41 is cylindrical, for example, and has a first opening 41*a* and a second opening 41*b*. The first opening 41*a* opens to a direction different from the air discharge port 14*a*. The second opening 41*b* opens to the air discharge port 14*a*. The tubular member 41 has a round-tube like wall 44. The wall 44 of the tubular member 41 forms a channel R2 for gas, the channel leading from the first opening 41*a* to the second opening 41*b*. The channel R2 is a channel that is an extension of the channel provided inside the air discharge duct 14, to the outside of the air discharge duct 14 (the outside of the enclosure 10). The tubular member 41 has such a shape that the channel bends at a plurality of points. The second opening 41*b* is provided to an area overlapping with a part of the air discharge port 14*a*, in a view from the +Z direction. Part of the gas discharged from the air discharge port 14*a* flows into the tubular member 41 through the second opening 41*b*.

In the tubular member 41, the second opening 41*b* opens to the −Z direction, in a manner facing the air discharge port 14*a*. The tubular member 41 extends in the +Z direction from the second opening 41*b*, and is bent toward the +X direction, and bent again toward the +Z direction. In this manner, the tubular member 41 is provided in a manner extending in the +Z direction and the +X direction, alternatingly. The first opening 41*a* opens to a direction different from the air discharge port 14*a*, e.g., to the +Z direction.

The tubular member 41 has an acoustic liner 49 having a plurality of pass-through holes 41*c* that are provided along the channel R2. Each of the pass-through holes 41*c* has a circular shape, for example, and the pass-through holes 41*c* are provided across the entire tubular member 41.

The cover member 42 has an outer shell 45 and an inner wall 46. The outer shell 45 is disposed on the area covering a part of the face 12*b* of the casing 12 of the enclosure 10 that includes the air discharge port 14*a*. The outer shell 45 has a shape of a rectangular box, for example. The outer shell 45 has a duct-side opening 45*a* and an outer-side opening 45*b*. The duct-side opening 45*a* is provided on the −Z side face of the outer shell 45 across the area facing the air discharge port 14*a*. The outer-side opening 45*b* is provided to the +Z side face of the outer shell 45, on the end of the +X side, in a manner facing the +Z direction.

The inner wall 46 partitions the inside of the outer shell 45. The inner wall 46 includes walls 46*a* and 46*b* making up the acoustic damper 43 for the tubular member 41 described above, a wall 46*c* that defines a channel R3 for distributing the gas discharged via the air discharge port 14*a* from routes other than the tubular member 41, and a wall 46*d* making up an acoustic damper 43 (rectangular-tube-side damper 48) corresponding to the channel R3. The tubular member 41 described above is partly housed in the space defined by the walls 46*a*, 46*b*, and 46*f*, and the outer shell 45. The channel R3 is partitioned by the wall 46*b* and the wall 46*c* mentioned above, and the −Z-side face and the +Y-side face of the outer shell 45. The channel R3 is connected to the outer-side opening 45*b* of the outer shell 45. The configuration of the inner walls 46, such as the arrangement of the walls 46*a*, 46*b*, 46*c*, 46*d*, for example, is not limited to that described above, and may be any other configurations.

The acoustic damper 43 includes a round-tube-side damper 47 corresponding to the channel R2 (tubular member 41), and the rectangular-tube-side damper 48 corresponding to the channel R3. The round-tube-side damper 47 and the rectangular-tube-side damper 48 have first damper sections 47*a*, 48*a*, respectively, and second damper sections 47*b*, 48*b*, respectively, the first and the second damper sections being designed for different frequencies, respectively. These different frequencies may be, for example, frequencies corresponding to the first-order and second-order resonance frequencies of the noise emitted from the power-generating source 22, respectively.

As described above, the noise suppressor 30, 40 according to this embodiment is a noise suppressor 30, 40 that is removably installed in the power generator equipment 100 including an enclosure 10 that includes at least one of the air intake port 13*a* and the air discharge port 14*a* that are the vents 15, and the power generator unit 20 that is covered with the enclosure 10, the noise suppressor 30, 40 including: the tubular member 31, 41 that has the first opening 31*a*, 41*a* that opens to a direction different from the vent 15, and the second opening 31*b*, 41*b* that opens to the vent 15, that forms the channel R1, R2 for gas, the channel leading from the first opening 31*a*, 41*a* to the second opening 31*b*, 41*b* and that is provided with the acoustic liner 38 inside the channel, wherein the tubular member 31, 41 has such a shape that the channel R2, R3 bends at a plurality of points.

Therefore, it becomes possible to suppress the noise appropriately in the power generator equipment 100 provided with the power generator unit 20 that is covered with the enclosure 10, while enabling the noise suppressor 30, 40 to be handled easily, e.g., attached or removed to or from the enclosure 10 easily, and achieving space saving, compared with a configuration including the linear tubular members 31 and 41.

In the noise suppressor 30, 40 according to the embodiment described above, the tubular member 31, 41 includes an acoustic liner formed by the pass-through holes 31*c*, 41*a* provided along the channel. Therefore, the noise can be reliably suppressed in the tubular member 31, 41.

In the noise suppressor 30 according to the embodiment described above, the enclosure 10 has the air intake ports 13*a*, the second opening 31*b* opens to the air intake port 13*a* in the direction along the face 12*a*, and the tubular member 31 extends from the second opening 31*b* in a direction along the face 12*a*. Therefore, the size in a direction perpendicular to the face 12*a* can kept small, and compactness can be ensured.

In the noise suppressor 30 according to the embodiment described above, the tubular member 31 is positioned in a manner surrounding the air intake port 13*a*, in a view from a direction perpendicular to the face 12*a*. Thus, the noise emitted from the air intake ports 13*a* can be efficiently reduced.

In the noise suppressor 30 according to the embodiment described above, the tubular members 31 are arranged symmetrically with respect to the air intake port 13*a* in a view from a direction perpendicular to the face 12*a*. Thus, the noise emitted from the air intake ports 13*a* can be efficiently reduced.

In the noise suppressor 40 according to the embodiment described above, the enclosure 10 has the air discharge port 14*a*, the second opening 41*b* is positioned facing the air discharge port 14*a*, and the tubular member 41 extends from the second opening 41*b* in a direction separating from the face 12*b*. Therefore, it is possible to suppress the noise emitted from the air discharge port 14*a*, while ensuring that the gas discharged from the air discharge port 14*a* is supplied into the tubular member 41.

The noise suppressor 30, 40 according to the embodiment described above also includes the acoustic damper 32, 43 disposed along the tubular member 31, 41. Thus, the noise emitted from the air intake port 13*a* and the air discharge port 14*a* can be efficiently reduced.

In the noise suppressor 30 according to the embodiment described above, the acoustic damper 32 is formed by providing the tubular member 31 with the wall 33 that partitions the channel R1, by providing the wall 33 with the hollow section 31*d* inside, and by connecting an end of the hollow section 31*d* to the channel R1, the end being on the side of the second opening 31*b*. Thus, the noise emitted from the air intake ports 13*a* can be efficiently reduced.

In the noise suppressor 30A according to the embodiment described above, the hollow section 31*d* has such a shape that the cross-sectional area thereof changes in the direction along the channel. Thus, it is possible to increase the band of frequencies of noise that can be suppressed.

In the noise suppressor 30B according to the embodiment described above, the tubular member 31 has the partitions 31*e* that partition the channel at a plurality of points in the direction along the channel R1 and is formed as the acoustic damper 32 by providing the partitions 31*e* with the connecting holes 31*f* connecting the spaces 31*s* adjacent to each other. Thus, the noise emitted from the air intake ports 13*a* can be efficiently reduced.

In the noise suppressor 30C according to the embodiment described above, the perforated plate 39 is disposed on the inner surface of the tubular member 31. Thus, the noise emitted from the air intake ports 13*a* can be efficiently reduced.

The technical scope of the present invention is not limited to the embodiment described above, and changes may be made as appropriate, within the scope not deviating from the gist of the present invention. For example, the configurations of the noise suppressors 30A, 30B, and 30C may be applied to the noise suppressor 40.

REFERENCE SIGNS LIST

10 Enclosure
11 Base plate
12 Casing
12*a*, 12*b* Face
13 Air intake duct
13*a* Air intake port
14 Air discharge duct
14*a* Air discharge port
15 Vent
20 Power generator unit
21 Power generator
22 Power-generating source
30, 30A, 30B, 30C, 40 Noise suppressor
31, 31B, 34, 35, 36, 37, 41 Tubular member
31*a*, 34*a*, 35*a*, 36*a*, 37*a*, 41*a* First opening
31*b*, 34*b*, 35*b*, 36*b*, 37*b*, 41*b* Second opening
31*c*, 41*a*, 41*c* Pass-through hole
31*d* Hollow section
31*e* Partition
31*f* Connecting hole
31*s* Space
32, 43 Acoustic damper
33, 33A, 33B, 44, 46*a*, 46*b*, 46*c*, 46*d* Wall
38 Acoustic liner
39 Perforated plate
42 Cover member
45 Outer shell

45*a* Duct-side opening
45*b* Outer-side opening
46 Inner wall
47 Round-tube-side damper
47*a*, 48*a* First damper section
47*b*, 48*b* Second damper section
48 Rectangular-tube-side damper
100 Power generator equipment
F Floor surface
R1, R2, R3 Channel

The invention claimed is:

1. A noise suppressor that is removably installed on power generator equipment including an enclosure and a power generator unit, the enclosure including at least one of an air intake port and an air discharge port that are vents, the power generator unit being covered with the enclosure, the noise suppressor comprising:

a tubular member having a first opening that opens to a direction different from the vent and a second opening that opens to the vent, forming a channel for gas leading from the first opening to the second opening, and provided with an acoustic liner inside the channel, wherein the tubular member has such a shape that the channel bends at a plurality of points, wherein the enclosure includes the air intake port, the second opening opens to the air intake port in a direction along a surface of the enclosure; and the tubular member extends from the second opening in a direction along the surface of the enclosure; and wherein the tubular member is disposed at a position surrounding the air intake port in a view in a direction perpendicular to the surface of the enclosure.

2. The noise suppressor according to claim 1, wherein the tubular member has the acoustic liner formed by a plurality of pass-through holes provided along the channel.

3. The noise suppressor according to claim 1, wherein a plurality of the tubular members are arranged symmetrically with respect to the air intake port in a view in a direction perpendicular to the surface of the enclosure.

4. The noise suppressor according to claim 1, wherein the enclosure includes the air discharge port, the second opening is positioned facing the air discharge port, and the tubular member extends from the second opening to a direction separating from a surface of the enclosure.

5. The noise suppressor according to claim 1, further comprising an acoustic damper disposed along the tubular member.

6. The noise suppressor according to claim 5, wherein the tubular member has a wall that partitions the channel, and the wall has a hollow section inside and is formed as the acoustic damper by connecting an end of the hollow section to the channel, the end on a side of the second opening.

7. The noise suppressor according to claim 6, wherein the hollow section has such a shape that a cross-sectional area changes in a direction along the channel.

8. The noise suppressor according to claim 5, wherein the tubular member has partitions that partition the channel at a plurality of positions in a direction along the channel and is formed as the acoustic damper by providing the partitions with connecting holes that connect spaces adjacent to each other.

9. The noise suppressor according to claim 1, wherein the tubular member has a perforated plate along an inner surface thereof.

* * * * *